(12) United States Patent
Jung et al.

(10) Patent No.: US 7,067,576 B2
(45) Date of Patent: Jun. 27, 2006

(54) FLAME RETARDANT POLYPROPYLENE RESIN COMPOSITION

(75) Inventors: In-Sik Jung, Taejon (KR); Jong-Soo Hong, Taejon (KR); Sung-Man Lee, Taejon (KR); Man-Seang Her, Taejon (KR)

(73) Assignee: Samsung Atofina, Co., Ltd., ChungNam Province (KR)

( * ) Notice: Subject to any disclaimer, the term of this patent is extended or adjusted under 35 U.S.C. 154(b) by 0 days.

(21) Appl. No.: 10/451,710

(22) PCT Filed: Dec. 22, 2000

(86) PCT No.: PCT/KR00/01523

§ 371 (c)(1),
(2), (4) Date: Oct. 27, 2003

(87) PCT Pub. No.: WO02/052059

PCT Pub. Date: Jul. 4, 2002

(65) Prior Publication Data

US 2004/0220312 A1 Nov. 4, 2004

(51) Int. Cl.
*C08K 3/22* (2006.01)
*C08K 5/02* (2006.01)
*C08K 5/5419* (2006.01)

(52) U.S. Cl. .................. 524/412; 524/262; 524/263; 524/264; 524/265; 524/411; 524/464; 524/469

(58) Field of Classification Search ........... 524/99–100, 524/261–269, 411–412, 464–473, 497
See application file for complete search history.

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altermore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scata et al. |
| 4,226,963 A | 10/1980 | Giannini et al. |
| 4,263,169 A | 4/1981 | Scata et al. |
| 4,277,372 A | 7/1981 | Matlack |
| 4,315,835 A | 2/1982 | Scata et al. |
| 4,315,874 A | 2/1982 | Ushida et al. |
| 4,323,747 A | 4/1982 | Takase et al. |

(Continued)

FOREIGN PATENT DOCUMENTS

| | | |
|---|---|---|
| DE | 3636060 | 5/1988 |
| EP | 0131832 | 7/1984 |

(Continued)

OTHER PUBLICATIONS

Wen et al. "Mechanics of Fluidization" Chemical Engineering Progress Symposium Series, 1962, vol. 62, 100–111.

Edelmann, "N–silylated benzamidines: versatile building blocks in main group and coordination chemistry," Coordination Chemistry Reviews, vol. 137, 1994, pp. 403–481.

Stokes et al., "Reactions of Cobaloxime Anions and/or Hydrides with Enynes as a New General Route to 1,3– and 1,2–Dienylcobaloxime Complexes," Organometallics, 1996, vol. 15, pp. 2624–2632.

Zhou et al., "Synthesis and Structure of Novel Bridged Dinuclear Indium Complexes," Inorg. Chem., 1996, vol. 35, pp. 1423–1424.

Tinkler et al., "Polymerisation of ethene by the novel titanium complex [Ti(Me3SiNCH2CH2NsiMe3)C12]; a metallocene analogue," Chem. Commun., 1996, pp. 2623–2624.

Linden et al., "Polymerization of a–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.

Zhou et al., "Bulky Amidinate Complexes of Tin(IV). Synthesis and Structure of Sn(RNC(R')NR)2C22 (R=Cyclohexyl, R'=H, Me; R=SiMe3, R'=tBu)," Inorg. Chem., 1997, vol. 36, pp. 501–504.

Averbuj et al. "Stereoregular Polymerization of a–Olefins Catalyzed by Chiral Group 4 Benzamidinate Complexes of C1 and C3 Symmetry" J. Am. Chem. Soc,1998, vol. 120, 8640–8646.

International Search Report PCT/KR00/01523, Sep. 21, 2001.

*Primary Examiner*—Peter Szekely
(74) *Attorney, Agent, or Firm*—Meyertons, Hood, Kivlin, Kowert & Goetzel, P.C.; Eric B. Meyertons

(57) ABSTRACT

The present invention provides a polypropylene resin composition including a polypropylene resin having a melt flow rate of 4–18 g/10 minutes, a flame retardant additive having a low melting point, an antimony oxide, a UV stabilizer, a silane coupling agent, and titanium dioxide as a light-blocking agent. The resin composition of the invention produces products exhibiting excellent flame retarding properties, stability against weather, and maintainability of physical/mechanical properties as shown by maintaining the original flame retarding properties after long periods of outdoor exposure and hydrothermal dipping treatments.

5 Claims, No Drawings

U.S. PATENT DOCUMENTS

| | | | |
|---|---|---|---|
| 4,330,649 | A | 5/1982 | Kioka et al. |
| 4,336,360 | A | 6/1982 | Giannini et al. |
| 4,355,143 | A | 10/1982 | Lassalle et al. |
| 4,380,507 | A | 4/1983 | Noristi et al. |
| 4,384,983 | A | 5/1983 | Hoff |
| 4,390,671 | A | 6/1983 | Imai et al. |
| 4,399,054 | A | 8/1983 | Ferraris et al. |
| 4,401,589 | A | 8/1983 | Kioka et al. |
| 4,417,019 | A | 11/1983 | Yamamoto et al. |
| 4,434,282 | A | 2/1984 | Esneault |
| 4,439,540 | A | 3/1984 | Cecchin et al. |
| 4,477,639 | A | 10/1984 | Nielsen |
| 4,482,687 | A | 11/1984 | Noshay et al. |
| 4,487,846 | A | 12/1984 | Bailly et al. |
| 4,514,513 | A | 4/1985 | Sato et al. |
| 4,518,706 | A | 5/1985 | Gessell |
| 4,529,716 | A | 7/1985 | Banzi et al. |
| 4,579,833 | A | 4/1986 | Collomb et al. |
| 4,613,655 | A | 9/1986 | Longi et al. |
| 4,614,727 | A | 9/1986 | Longi et al. |
| 4,615,831 | A | 10/1986 | Kanno et al. |
| 4,642,328 | A | 2/1987 | Morterol et al. |
| 4,673,719 | A | 6/1987 | Kioka et al. |
| 4,729,854 | A | 3/1988 | Miyata et al. |
| 4,761,392 | A | 8/1988 | Shiga et al. |
| 4,777,639 | A | 10/1988 | Whitehouse |
| 4,806,433 | A | 2/1989 | Sasaki et al. |
| 4,812,074 | A | 3/1989 | Ausnit et al. |
| 4,816,433 | A | 3/1989 | Terano et al. |
| 4,829,037 | A | 5/1989 | Terano et al. |
| 4,843,049 | A | 6/1989 | Invernizzi et al. |
| 4,847,227 | A | 7/1989 | Murai et al. |
| 4,847,639 | A | 7/1989 | Sugata et al. |
| 4,866,022 | A | 9/1989 | Arzoumanidis et al. |
| 4,946,816 | A | 8/1990 | Cohen et al. |
| 4,952,649 | A | 8/1990 | Kioka et al. |
| 4,962,167 | A | 10/1990 | Shiraishi et al. |
| 4,970,186 | A | 11/1990 | Terano et al. |
| 4,978,648 | A | 12/1990 | Barbe et al. |
| 4,988,656 | A | 1/1991 | Arzoumanidis et al. |
| 4,990,479 | A | 2/1991 | Ishimaru et al. |
| 5,006,499 | A | 4/1991 | Daire |
| 5,013,702 | A | 5/1991 | Arzoumanidis et al. |
| 5,021,382 | A | 6/1991 | Malpass, Jr. |
| 5,059,570 | A | 10/1991 | Bailly et al. |
| 5,061,667 | A | 10/1991 | Murata et al. |
| 5,064,798 | A | 11/1991 | Chang |
| 5,081,090 | A | 1/1992 | Arzoumanidis et al. |
| 5,104,838 | A | 4/1992 | Fujita et al. |
| 5,106,807 | A | 4/1992 | Morini et al. |
| 5,124,297 | A | 6/1992 | Arzoumanidis et al. |
| 5,130,284 | A | 7/1992 | Terano et al. |
| 5,134,104 | A | 7/1992 | Sasaki et al. |
| 5,175,332 | A | 12/1992 | Chatterton et al. |
| 5,182,245 | A | 1/1993 | Arzoumanidis et al. |
| 5,218,052 | A | 6/1993 | Cohen et al. |
| 5,244,996 | A | 9/1993 | Kawasaki et al. |
| 5,346,872 | A | 9/1994 | Menon et al. |
| 5,419,116 | A | 5/1995 | Rast et al. |
| 5,439,995 | A | 8/1995 | Bailly et al. |
| 5,455,316 | A | 10/1995 | Tsutsui et al. |
| 5,459,116 | A | 10/1995 | Ro et al. |
| 5,498,770 | A | 3/1996 | Hosaka et al. |
| 5,502,128 | A | 3/1996 | Flores et al. |
| 5,585,317 | A | 12/1996 | Sacchetti et al. |
| 5,587,436 | A | 12/1996 | Klimek et al. |
| 5,587,440 | A | 12/1996 | Ehlers et al. |
| 5,618,886 | A | 4/1997 | Shinozaki et al. |
| 5,629,390 | A | 5/1997 | Nishimura et al. |
| 5,643,845 | A | 7/1997 | Tajima et al. |
| 5,696,044 | A | 12/1997 | Zakharov et al. |
| 5,726,261 | A | 3/1998 | Sacchetti et al. |
| 5,780,378 | A | 7/1998 | Toida et al. |
| 5,798,424 | A | 8/1998 | Kong et al. |
| 5,817,591 | A | 10/1998 | Shamshoum et al. |
| 5,844,046 | A | 12/1998 | Ohgizawa et al. |
| 5,849,654 | A | 12/1998 | Fushimi et al. |
| 5,849,655 | A | 12/1998 | Shamshoum et al. |
| 5,865,478 | A | 2/1999 | Lin |
| 5,869,418 | A | 2/1999 | Iiskola et al. |
| 5,877,265 | A | 3/1999 | Toida et al. |
| 5,880,056 | A | 3/1999 | Tsutsui et al. |
| 5,936,049 | A | 8/1999 | Kojoh et al. |
| 5,948,872 | A | 9/1999 | Kioka et al. |
| 5,968,862 | A | 10/1999 | Abbott et al. |
| 6,028,149 | A | 2/2000 | Luciani et al. |
| 6,034,025 | A | 3/2000 | Yang et al. |
| 6,066,702 | A | 5/2000 | Ro et al. |
| 6,111,038 | A | 8/2000 | Kioka et al. |
| 6,114,276 | A | 9/2000 | Kong et al. |
| 6,214,759 | B1 | 4/2001 | Chang et al. |
| 6,218,331 | B1 | 4/2001 | DiMaio et al. |
| 6,235,854 | B1 | 5/2001 | Kioka et al. |
| 6,291,385 | B1 | 9/2001 | Lee et al. |
| 6,323,150 | B1 | 11/2001 | Kojoh et al. |
| 6,482,764 | B1 | 11/2002 | Chang et al. |
| 6,521,560 | B1 | 2/2003 | Kojoh et al. |
| 6,537,942 | B1 | 3/2003 | Shinozaki et al. |
| 6,559,250 | B1 | 5/2003 | Ro et al. |
| 2001/0031694 | A1 | 10/2001 | Yang et al. |
| 2002/0037980 | A1 | 3/2002 | Yang et al. |
| 2002/0045537 | A1 | 4/2002 | Yang et al. |
| 2002/0120079 | A1 | 8/2002 | Ro et al. |

FOREIGN PATENT DOCUMENTS

| | | |
|---|---|---|
| EP | 0350170 | 1/1990 |
| EP | 0385765 | 9/1990 |
| EP | 0602922 | 6/1994 |
| EP | 0606125 | 7/1994 |
| EP | 0607703 | 7/1994 |
| EP | 0669347 | 8/1995 |
| EP | 0391336 | 6/1999 |
| GB | 1335887 | 10/1973 |
| GB | 1492618 | 1/1975 |
| GB | 1577643 | 10/1980 |
| JP | 51136625 | 11/1976 |
| JP | 52111528 | 9/1977 |
| JP | 59145206 | 8/1984 |
| JP | 61055103 | 3/1986 |
| JP | 61268704 | 11/1986 |
| JP | 62081405 | 4/1987 |
| JP | 63199703 | 8/1988 |
| JP | 63-191811 | 9/1988 |
| JP | 63-54004 | 10/1988 |
| JP | 63308003 | 12/1988 |
| JP | 06-340711 | 5/1993 |
| JP | 07-330675 | 8/1995 |
| JP | 09176226 | 7/1997 |
| KR | 1020010084520 | 9/2001 |
| WO | WO 00/73355 | 7/2000 |
| WO | WO 01/32718 | 5/2001 |
| WO | WO 01/78687 | 10/2001 |
| WO | WO 02/38619 | 5/2002 |
| WO | WO 02/38620 | 5/2002 |
| WO | WO 02/38622 | 5/2002 |
| WO | WO 02/38623 | 5/2002 |
| WO | WO 02/38624 | 5/2002 |
| WO | WO 02/48206 | 7/2002 |
| WO | WO 02/051882 | 7/2002 |
| WO | WO 02/051933 | 7/2002 |
| WO | WO 02/051934 | 7/2002 |
| WO | WO 03/000747 | 3/2003 |

FLAME RETARDANT POLYPROPYLENE RESIN COMPOSITION

BACKGROUND OF THE INVENTION

1. Field of the Invention

The present invention relates to a flame-retardant polypropylene resin composition having polypropylene resin as a main component, and more particularly, to a polypropylene resin composition which includes a polypropylene resin with a melt flow rate of 4–18 g/10 minutes, a halogen-containing flame retardant additive with a low melting point, an antimony oxide, an ultraviolet stabilizer, a silane coupling agent, and titanium dioxide used as a light-blocking agent. The resin composition exhibits good weathering properties and maintains the same level of flame retardancy as well as other physical/mechanical property characteristics after a hydrothermal dipping treatment.

2. Description of the Related Art

Polypropylene resins are used extensively in home electronic appliances, building members, interior decorating materials, and automobile parts due to their excellent processing characteristics, chemical resistance, and mechanical strength. These resins, however, lack flame retardancy and are therefore difficult to use in the manufacture of automobile parts or electronic components which require protection against the danger of fire. As a result, the effects of the addition of various organic, inorganic, and phosphorus flame retardant additives on flame retardancy in polyolefin resins have been studied extensively.

Japanese Patent Publication Nos. 53-92855, 54-29350, 54-77658, 56-26954, 57-87462, and 60-110738 disclose preparation methods of producing flame retardant polypropylene resin compositions by adding inorganic flame retardant additives such as magnesium hydroxide, aluminum hydroxide, or hydrotalcite. However, in order to obtain a flame retardant grade of V-0, a resin composition including more than 50% by weight of the inorganic filler is needed. This high level of inorganic filler results in a deterioration of the processability of the resin, generation of gas during processing, and a decrease in impact strength of the resin product.

Japanese Patent Publication No. 53-30739 discloses flame retardant polypropylene resin compositions produced by adding organic halogen-containing flame retardant additives such as decabromodiphenylether and dodecachlorododecahydromethanodibenzocyclooctane. Other flame retardant polypropylene resin compositions are produced by adding tetrabromobisphenol A bis-(dibromopropylether), bis-(tribromophenoxyethyl)tetrabromobisphenol A ether, hexabromo cyclododecane, and tetrabromobisphenol A. Although these resin compositions exhibit excellent flame retardancy and processability, weatherability and resistance to hot water are poor making it difficult to use the resin in outdoor products such as light bulb sockets for Christmas tree lights.

SUMMARY OF THE INVENTION

The object of the invention is to solve the problems described above and to provide a flame-retardant polypropylene resin composition that exhibits good flame retardancy for thin-walled structures, produces products that maintain good flame retardancy even after long outdoor exposure times or hydrothermal dipping treatments, and exhibit good weather resistance while maintaining the mechanical properties of the resin.

The flame-retardant polypropylene resin composition of the present invention includes about 40–90% by weight polypropylene resin with a melt flow rate of about 4–18 g/10 minutes, about 9–16% by weight halogen-containing flame retardant additive with a low melt point, about 4–15% by weight antimony oxide in the form of white granules, about 0.2–3.0% by weight ultraviolet stabilizer, about 0.1–5% by weight silane coupling agent, and about 0.2–5% by weight titanium dioxide.

In the flame-retardant polypropylene resin composition of the present invention, the polypropylene resin may be a crystalline polypropylene homopolymer or a polypropylene copolymer of propylene with comonomers including ethylene, 1-butene, 1-pentene, 1-hexene, 4-methylpentene, 1-heptene, 1-octene, 1-decene, or mixtures thereof. The preferred polypropylene resin is a crystalline polypropylene homopolymer. The melt flow rate of the polypropylene resin may be about 4–18 g/10 minutes, or more preferably about 5–15 g/10 minutes. The amount of polypropylene resin in the overall resin composition may be 40–86% by weight, or more preferably, 50–86% by weight.

In the flame-retardant polypropylene resin composition of the present invention, the halogen-containing flame retardant additive with a low melt point may be tetrabromobisphenol A bis-(dibromopropylether), tetrabromo dimethylsulfone dipropylether, or mixtures thereof. Examples of commercially available products include PE-68 (manufactured by Great Lakes Corporation) and P680G (manufactured by Suzuhiro Chemicals, Co.). A preferred amount of tetrabromobisphenol A bis-(dibromopropylether) or tetrabromodimethylsulfone dipropylether in the resin composition is about 9–16% by weight based on the overall weight of the resin composition. When the amount of flame retardant additive is below about 9% by weight, a flame retardancy grade of V-0 cannot be obtained for a film thickness of 1/32 inch. When the amount of flame retardant additive is above about 16% by weight, weather resistance is reduced making it difficult to maintain the mechanical properties of the resin.

The silane coupling agent in the flame-retardant polypropylene resin composition of the present invention may be represented by the following general formula:

where R is a hydrocarbon including vinyl, chloro, amino, and mercapto; X is an organic group that can be hydrolyzed; and R' may be R or X. Examples of the silane coupling agent include vinyl trimethoxy silane, vinyl triethoxy silane, 3-aminopropyl triethoxy silane, N-(2-aminoethyl)-3-aminopropyltrimethoxy silane, 3-glycydoxypropyl trimethoxy silane, 3-chloropropyl trimethoxy silane, 3-methacryloxypropyl trimethoxy silane, and 3-mercaptopropyltrimethoxy silane. To improve dispersive strength and adhesive strength when using antimony trioxide and halogen-containing flame retardant additives, preferred silane coupling agents include vinyl trimethoxy silane, vinyl triethoxy silane, and 3-mercaptopropyltrimethoxy silane.

The amount of silane coupling agent used in the resin composition may be about 0.1–5% by weight, preferably about 0.15–3% by weight, and more preferably about 0.3–1% by weight based on the weight of the overall resin composition. When the amount of silane coupling agent in the resin composition is below about 0.1% by weight, the dispersive strength and adhesive strength of the resin are not improved with the use of antimony trioxide or halogen-containing flame retardant additives. In addition, blooming of the flame retardant additive during dipping in a hydrothermal test cannot be prevented making it difficult to maintain a flame retardancy grade of V-0 for a film thickness of 1/32 inch. When the silane coupling agent amount is increased to levels of above about 5% by weight, there is no further improvement in the prevention of blooming of the flame retardant additive.

In the flame-retardant polypropylene resin composition of the present invention, it is preferable to use UV absorbers and HALS stabilizers simultaneously as ultraviolet stabilizers. The preferred HALS stabilizer has a molecular weight of more than about 2,000. If the molecular weight of the HALS stabilizer is below about 2,000, ultraviolet stabilizers easily bloom out of the secondary product making it difficult to maintain long-term ultraviolet stability. The UV absorber and HALS ultraviolet stabilizer are preferably used in the resin composition in amounts of about 0.1–1.5% by weight each. If the UV absorber or HALS ultraviolet stabilizer is used alone in the resin composition, a flame retardancy grade of V-0 may be obtained; however, it may be difficult to produce a resin composition which meets the F1 standard for tensile impact strength after UV exposure treatment.

In the flame-retardant polypropylene resin composition of the present invention, titanium dioxide is used as a light-blocking agent in order to obtain a grade of F1 for environmental resistance. The preferred amount of titanium dioxide is about 0.2–5% by weight. If the amount of titanium dioxide in the resin composition is below about 0.2% by weight, synergistic effects with the ultraviolet stabilizer are absent. Above amounts of about 5% by weight, there is no further improvement in light blocking ability.

In the flame-retardant polypropylene resin composition of the present invention, antimony trioxide, antimony pentaoxide, or mixtures thereof may be used as the antimony oxide component. The antimony oxide may used in an amount of about 4–15% by weight and preferably about 5–12% by weight based on the weight of the overall resin composition.

The flame-retardant polypropylene resin composition of the present invention exhibits excellent flame retardancy providing a grade of V-0 for a film thickness of 1/32 inch in the vertical burning test (hereinafter referred to as "UL 94 vertical burning test") carried out as described in "Flammability Test of Plastic Materials for Parts of Mechanical device" of UL Subject 94. In addition, the resin composition not only maintains its mechanical properties but maintains the same grade of flame retardancy after long outdoor exposure times and hydrothermal dipping treatments as indicated by weathering and water resistance testing (hereinafter referred to as "UL 746C weather proof test") carried out as described in "Test for Flammability of Plastic Materials for Parts in Electric Device" of UL subject 746C. Therefore, the resin composition of the present invention can be used in the production of electric appliances, building members, interior or exterior decorating materials, and automotive parts.

The present invention will be further described in detail with reference to the examples and comparative examples as described below. The examples, however, are for the purpose of illustration and are not intended to limit the scope of the invention.

DETAILED DESCRIPTION OF THE PREFERRED EMBODIMENTS

EXAMPLE 1

The following components were added into a Hensel mixer and mixed by stirring for 3 minutes: 7.9 kg crystalline polypropylene homopolymer with a melt flow rate of 8 g/10 minutes as the polypropylene resin component, 1.4 kg tetrabromobisphenol A bis-(dibromopropylether) (PE-68 produced by Great Lakes Corporation), 700 g antimony trioxide ($Sb_2O_3$ produced by Cheil Flame Retardant, Ltd., 1.2 μm), and as additives, 10 g calcium stearate, 10 g antioxidant (1010 Produced by CIBA GEIGY), 20 g IRGAFOS 168 (produced by CIBA GEIGY), 30 g UV absorber (Tinuvin 326 produced by CIBA GEIGY), 30 g HALS ultraviolet stabilizer (Chimabsorber 944FD produced by CIBA GEIGY), 200 g light-blocking agent $TiO_2$ (R-103 produced by Dupont, Inc.), and 70 g silane coupling agent (A-174 produced by Union carbide). The mixture was extruded at 190° C. in the form of pellets using a two-axis stirring extruder with a diameter of 30 mm. The extruded pellets were dried for three hours at 100° C. Flame retardancy test pieces were formed using an injection-molding machine with a maximum cylinder temperature fixed at 200° C. Flame retardancy and physical/mechanical properties of the test pieces were then determined. Results are shown in Table 1.

Method of Treatment

The test pieces were UV treated using ASTM 2565 Type A under weathering conditions as described in "Tests for Flammability of Plastic Materials for Parts in Electrical device" of UL 746C (Underwriter's Laboratories Incorporation) (UV irradiation quantity: 0.35 $W/m^2$ at 340 nm, black board temperature: 63° C., water spray method). The test pieces were dipped in a hydrothermal tank at a temperature of 70° C. and maintained for 7 days. Flame retardancy and physical/mechanical properties of the test pieces were then determined.

Method of Evaluation

Flame retardancy was evaluated using vertical burning tests as described in "Tests for Flammability of Plastic Materials for Parts in Mechanical device" of UL 94 (Underwriters Laboratories, Inc.). The thickness of each test piece was 1/32 inch. The tensile impact strength and maintenance rate were evaluated using the impact strength test standard ASTM D-1822. The measuring instrument was produced by TOYOSEIKI and used an S-type sample with a thickness of 1/8 inch.

EXAMPLE 2 AND COMPARATIVE EXAMPLES 1–3

The pellets were prepared in the same way as described in Example 1 except that the amount of light-blocking agent, R-103, was modified as shown in Table 1. The extruded pellets were molded using an injection-molding machine to provide test pieces for determining flame retardancy and tensile impact strength. The flame retardancy and physical/mechanical properties were then determined. Results are shown in Table 1.

A comparison of the results of Examples 1–2 and the results of Comparative examples 1–3, as presented in Table 1, shows that when appropriate amounts of $TiO_2$ are added as a light-blocking agent, a synergistic effect with the UV absorber and HALS ultraviolet stabilizer occurs. The synergy makes it possible to maintain a high tensile impact strength as well as a flame retardancy grade of V-0 after UV exposure. Flame retardancy and tensile impact strength, as well as weatherability, are also maintained after a hydrothermal dipping treatment providing a UL 764C grade of F1 for indoor and outdoor electrical devices.

EXAMPLES 3–4 AND COMPARATIVE EXAMPLES 4–5

The pellets were prepared in the same way as described in Example 1 except that the amount of antimony trioxide used as a flame retardant additive was modified as shown in Table 1. The extruded pellets were molded using an injection-molding machine to provide test pieces for determining flame retardancy and tensile impact strength. Flame retardancy and physical/mechanical properties were then determined. Results are shown in Table 1.

A comparison of the results of Examples 3–4 with the results of Comparative examples 4–5, as presented in Table 1, shows that the amount of flame retardant additive in the composition should be below a certain level in order to promote synergy between the flame retardant and the UV absorber and stabilizers. The flame retardant should be maintained below a given amount in the composition in order to maintain flame retardancy after UV exposure testing and hydrothermal dipping treatments as well. When antimony trioxides are added in excess of about 17%, the physical/mechanical properties are degraded and no further synergistic effects with flame retardancy are exhibited thereby preventing a UL 764C grade of F1.

EXAMPLE 5

The following components were added into a Hensel mixer and mixed by stirring for 3 minutes: 7.9 kg crystalline polypropylene homopolymer with a melt flow rate of 4 g/10 minutes as the polypropylene resin component, 1.4 kg tetrabromobisphenol A bis-(dibromopropylether) (PE-68 produced by Great Lakes Corporation), 700 g antimony trioxide ($Sb_2O_3$ produced by Cheil Flame Retardant, Ltd., 1.2 µm), and as additives, 10 g calcium stearate, 10 g antioxidant (1010 Produced by CIBA GEIGY), 20 g IRGAFOS 168 (produced by CIBA GEIGY), 30 g UV absorbent (Tinuvin 326 produced by CIBA GEIGY), 30 g HALS ultraviolet stabilizer (Chimabsorber 944FD produced by CIBA GEIGY), 200 g light-blocking agent $TiO_2$ (R-103 produced by Dupont, Inc.), and 70 g of silane coupling agent (A-174 produced by Union carbide). The mixture was extruded at 190° C. in the form of pellets using a two-axis stirring extruder with a diameter of 30 mm. The extruded pellets were dried for three hours at 100° C. Flame retardancy test pieces were formed using an injection-molding machine with a maximum cylinder temperature fixed at 200° C. Flame retardancy and physical/mechanical properties of the test pieces were then determined. The methods of treatment and evaluation were the same as described in Example 1. Results are presented in Table 1.

EXAMPLE 6 AND COMPARATIVE EXAMPLES 6–7

The pellets were prepared in the same way as described in Example 1 except that the polypropylene resin was changed to a polypropylene resin with a different melt flow rate as shown in Table 1. The extruded pellets were molded using an injection-molding machine to provide test pieces for determining flame retardancy and tensile impact strength. Flame retardancy and physical/mechanical properties were then determined. Results are shown in Table 1.

As seen in Table 1, the melt flow rate of the polypropylene resin has a large effect on the properties of the composition as shown by the results of the UV exposure testing and hydrothermal dipping treatments. If the melt flow rate of the polypropylene resin is less than about 4 g/10 minitues, the initial properties are excellent; however, after UV exposure testing, the physical/mechanical properties are degraded. If the melt flow rate is above 20 g/10 minitues, the initial flame retardancy and the flame retardancy after UV exposure testing and hydrothermal dipping treatment do not meet the requirements of the V-0 grade of flame retardancy at a film thickness of 1/32 inch. Therefore, in order to maintain a UL 764C grade of F1, the preferred melt flow rate range for polypropylene is about 4–18 g/10 minutes.

EXAMPLE 7

The following components were added into a Hensel mixer and mixed by stirring for 3 minutes: 7.9 kg crystalline polypropylene homopolymer with a melt flow rate of 8 g/10 minutes as the polypropylene resin component, 1.4 kg tetrabromobisphenol A bis-(dibromopropylether) (PE-68 produced by Great Lakes Corporation), 700 g antimony trioxide ($Sb_2O_3$ produced by Cheil Flame Retardant, Ltd., 1.2 µm), and as additives, 10 g calcium stearate, 10 g antioxidant (1010 Produced by CIBA GEIGY), 20 g IRGAFOS 168 (produced by CIBA GEIGY), 30 g UV absorber (Tinuvin 326 produced by CIBA GEIGY), 30 g HALS ultraviolet stabilizer (Chimabsorber 944FD produced by CIBA GEIGY), 200 g light-blocking agent $TiO_2$ (R-103 produced by Dupont, Inc.), and 15 g silane coupling agent (A-174 produced by Union carbide). The mixture was extruded at 190° C. in the form of pellets using a two-axis stirring extruder with a diameter of 30 mm. The extruded pellets were dried for three hours at 100° C. Flame retardancy test pieces were formed using an injection-molding machine with a maximum cylinder temperature fixed at 200° C. Flame retardancy and physical/mechanical properties of the test pieces were determined. The methods of treatment and evaluation were the same as described in Example 1. Results are shown in Table 2.

EXAMPLE 8 AND COMPARATIVE EXAMPLES 8–10

The pellets were prepared in the same way as described in Example 1 except that the amount of silane coupling agent, A-174, was modified as shown in Table 2.

The pellets extruded in examples 7 and 8 were dried for three hours at 100° C. Flame retardancy test pieces were formed using an injection-molding machine with a maximum cylinder temperature fixed at 200° C. Flame retardancy and physical/mechanical properties of the test pieces were then determined. Results are shown in Table 2.

As seen in Table 2, when appropriate amounts of silane coupling agent are added, the adhesiveness between the flame retardant agent and the polypropylene resin and the dispersibility of retardant agent or retardant coagent in the polypropylene resin are improved. A flame retardancy grade of V-0 is achieved and tensile strength is maintained as well. Furthermore, improved environmental resistance provides a UL 764C grade of F1. The preferred range of silane coupling agent is about 0.3–3% by weight.

EXAMPLE 9

The following components were added into a Hensel mixer and mixed by stirring for 3 minutes: 7.9 kg crystalline polypropylene homopolymer with a melt flow rate of 8 g/10 minutes as the polypropylene resin component, 1.4 kg tetrabromobisphenol A bis-(dibromopropylether) (PE-68 produced by Great Lakes Corporation), 700 g antimony trioxide ($Sb_2O_3$ produced by Cheil Flame Retardant, Ltd., 1.2 µm), and as additives, 10 g calcium stearate, 10 g antioxidant (1010 Produced by CIBA GEIGY), 20 g IRGAFOS 168 (produced by CIBA GEIGY), 70 g UV absorber (Tinuvin 326 produced by CIBA GEIGY), 70 g HALS ultraviolet stabilizer (Chimabsorber 944FD produced by CIBA GEIGY), 200 g light-blocking agent $TiO_2$ (R-103 produced by Dupont, Inc.), and 70 g silane coupling agent (A-174 produced by Union carbide). The mixture was extruded at 190° C. in the form of pellets using a two-axis stirring extruder with a diameter of 30 mm. The extruded pellets were dried for three hours at 100° C. Flame retardancy test pieces were formed using an injection-molding machine with a maximum cylinder temperature fixed at 200° C. Flame retardancy and physical/mechanical properties of the test pieces were then determined. The methods of treatment and evaluation were the same as described in Example 1. Results are shown in Table 2.

EXAMPLE 10 AND COMPARATIVE EXAMPLES 11–16

The pellets were prepared in the same way as described in Example 1 except that the amounts of UV absorber and HALS ultraviolet stabilizer in the composition were modified as shown in Table 2. The extruded pellets were molded using an injection-molding machine to provide test pieces for flame retardancy testing and tensile impact strength testing. Flame retardancy and physical/mechanical properties were then determined Results are shown in Table 2.

As seen in Table 2, using a mixture of UV absorber and HALS ultraviolet stabilizer in the appropriate amounts provides improved flame retardancy and environmental resistance.

EXAMPLE 11

The following components were added into a Hensel mixer and mixed by stirring for 3 minutes: 8.1 kg crystalline polypropylene homopolymer with a melt flow rate of 8 g/10 minutes as the polypropylene resin component, 1.3 kg tetrabromobisphenol A bis-(dibromopropylether) (PE-68 produced by Great Lakes Corporation), 650 g antimony trioxide (Sb2O3 produced by Cheil Flame Retardant, Ltd., 1.2 μm), and as additives, 10 g calcium stearate, 10 g antioxidant (1010 Produced by CIBA GEIGY), 20 g IRGAFOS 168 (produced by CIBA GEIGY), 30 g UV absorbent (Tinuvin 326 produced by CIBA GEIGY), 30 g HALS ultraviolet stabilizer (Chimabsorber 944FD produced by CIBA GEIGY), 200 g light-blocking agent $TiO_2$ (R-103 produced by Dupont, Inc.), and 70 g silane coupling agent (A-174 produced by Union carbide). The mixture was extruded at 190° C. in the form of pellets using a two-axis stirring extruder with a diameter of 30 mm. The extruded pellets were dried for three hours at 100° C. Flame retardancy test pieces were formed using an injection-molding machine with a maximum cylinder temperature fixed at 200° C. Flame retardancy and physical/mechanical properties of the test pieces were then determined. The methods of treatment and evaluation were the same as described in Example 1. Results are shown in Table 2.

EXAMPLE 12 AND COMPARATIVE EXAMPLES 17–18

The pellets were prepared in the same way as described in Example 1 except that the amounts of flame retardant agent PE-68 (tetrabromobisphenol A bis-(dibromopropylether)) and flame retardant coagent Sb 203 (antimony trioxide) in the composition were modified as shown in Table 2. The extruded pellets were molded using an injection-molding machine to provide test pieces for flame retardancy testing and tensile impact strength testing. Flame retardancy and physical/mechanical properties were then measured. Results are shown in Table 2.

As seen in Table 2, using a mixture of flame retardant agent and coagent in specific amounts improves flame retardancy and environmental resistance.

TABLE 1

| | Composition Component (100 g) | | | | | | | Before Treatment | | 1,000 hours after Exposing to UV | | | |
|---|---|---|---|---|---|---|---|---|---|---|---|---|---|
| | | | | | | | | Flame retardancy | Tensile impact | Flame retardancy | Tensile impact | Maintenance of | Maintenance of |
| | A | B | C | D | E | F | G | (1/32") | strength | (1/32") | strength | FR | TIS(%) |
| E1 | 79 | 14 | 7 | 0.30 | 0.30 | 2.00 | 0.70 | V0 | 38.5 | V0 | 35.6 | M* | 92 |
| E2 | 79 | 14 | 7 | 0.30 | 0.30 | 5.00 | 0.70 | V0 | 39.0 | V0 | 34.1 | M | 87 |
| CE1 | 79 | 14 | 7 | 0.30 | 0.30 | 0.10 | 0.70 | V0 | 38.9 | V0 | 26.3 | M | 68 |
| CE2 | 79 | 14 | 7 | 0.30 | 0.30 | 7.00 | 0.70 | V0 | 39.4 | V0 | 27.5 | M | 70 |
| CE3 | 79 | 14 | 7 | 0.30 | 0.30 | 0.00 | 0.70 | V0 | 36.0 | V2 | 20.1 | D* | 56 |
| E3 | 76 | 14 | 10 | 0.30 | 0.30 | 2.00 | 0.70 | V0 | 38.2 | V0 | 35.4 | M | 93 |
| E4 | 71 | 14 | 15 | 0.30 | 0.30 | 2.00 | 0.70 | V0 | 37.1 | V0 | 34.1 | M | 92 |
| CE4 | 69 | 14 | 17 | 0.30 | 0.30 | 2.00 | 0.70 | V0 | 39.6 | V0 | 27.5 | M | 69 |
| CE5 | 83 | 14 | 3 | 0.30 | 0.30 | 2.00 | 0.70 | V2 | 38.3 | V2 | 36.4 | B* | 95 |
| E5 | (A1)79 | 14 | 7 | 0.30 | 0.30 | 2.00 | 0.70 | V0 | 39.5 | V0 | 36.3 | M | 92 |
| E6 | (A2)79 | 14 | 7 | 0.30 | 0.30 | 2.00 | 0.70 | V0 | 35.4 | V0 | 34.1 | M | 96 |
| CE6 | (A3)79 | 14 | 7 | 0.30 | 0.30 | 2.00 | 0.70 | V0 | 44.5 | V0 | 30.4 | M | 68 |
| CE7 | (A4)79 | 14 | 7 | 0.30 | 0.30 | 2.00 | 0.70 | V2 | 32.1 | V2 | 30.4 | M | 95 |

| | Composition Component (100 g) | | | | | | | 168 hours (7 days) after hydrothermal dipping | | | | |
|---|---|---|---|---|---|---|---|---|---|---|---|---|
| | | | | | | | | Flame retardancy | Tensile impact | Maintenance of | Maintenance of | |
| | A | B | C | D | E | F | G | (1/32") | strength | FR | TIS(%) | Final Grade |
| E1 | 79 | 14 | 7 | 0.30 | 0.30 | 2.00 | 0.70 | V0 | 42.6 | M | 111 | F1 |
| E2 | 79 | 14 | 7 | 0.30 | 0.30 | 5.00 | 0.70 | V0 | 39.4 | M | 101 | F1 |
| CE1 | 79 | 14 | 7 | 0.30 | 0.30 | 0.10 | 0.70 | V2 | 39.4 | D | 101 | NG* |

TABLE 1-continued

| | | | | | | | | | | | | |
|---|---|---|---|---|---|---|---|---|---|---|---|---|
| CE2 | 79 | 14 | 7 | 0.30 | 0.30 | 7.00 | 0.70 | V0 | 36.9 | M | 94 | F1 |
| CE3 | 79 | 14 | 7 | 0.30 | 0.30 | 0.00 | 0.70 | V2 | 42.0 | D | 117 | NG |
| E3 | 76 | 14 | 10 | 0.30 | 0.30 | 2.00 | 0.70 | V0 | 41.0 | M | 107 | F1 |
| E4 | 71 | 14 | 15 | 0.30 | 0.30 | 2.00 | 0.70 | V0 | 38.3 | M | 103 | F1 |
| CE4 | 69 | 14 | 17 | 0.30 | 0.30 | 2.00 | 0.70 | V0 | 37.6 | M | 95 | F2 |
| CE5 | 83 | 14 | 3 | 0.30 | 0.30 | 2.00 | 0.70 | V2 | 38.4 | B | 100 | NG |
| E5 | (A1)79 | 14 | 7 | 0.30 | 0.30 | 2.00 | 0.70 | V0 | 42.6 | M | 108 | F1 |
| E6 | (A2)79 | 14 | 7 | 0.30 | 0.30 | 2.00 | 0.70 | V0 | 42.6 | M | 120 | F1 |
| CE6 | (A3)79 | 14 | 7 | 0.30 | 0.30 | 2.00 | 0.70 | V0 | 42.6 | M | 96 | F2 |
| CE7 | (A4)79 | 14 | 7 | 0.30 | 0.30 | 2.00 | 0.70 | V2 | 32.6 | M | 102 | NG |

*unit of tensile impact strength: kg · cm/cm square
*NG: No Grade
*FR: Flame Retardancy, TIS: Tensile Impact Strength, NG: No Grade
*M: Maintained, D: Deteriorated, B: Below the standard

TABLE 2

| | Composition Component (100 g) | | | | | | | Before Treatment | | 1,000 hours after Exposing to UV | | | |
|---|---|---|---|---|---|---|---|---|---|---|---|---|---|
| | | | | | | | | Flame retardancy (1/32") | Tensile impact strength | Flame retardancy (1/32") | Tensile impact strength | Mainten-ance of FR | Mainten-ance of TIS (%) |
| | A | B | C | D | E | F | G | | | | | | |
| E7 | 79 | 14 | 7 | 0.30 | 0.30 | 2.00 | 0.15 | V0 | 35.1 | V0 | 28.7 | M | 82 |
| E8 | 79 | 14 | 7 | 0.30 | 0.30 | 2.00 | 3.00 | V0 | 32.6 | V0 | 26.4 | M | 81 |
| CE8 | 79 | 14 | 7 | 0.30 | 0.30 | 2.00 | 5.00 | V0 | 34.2 | V0 | 25.9 | M | 76 |
| CE9 | 79 | 14 | 7 | 0.30 | 0.30 | 2.00 | 0.00 | V0 | 40.2 | V0 | 22.4 | M | 56 |
| CE10 | 79 | 14 | 7 | 0.30 | 0.30 | 2.00 | 0.05 | V0 | 37.1 | V0 | 27.5 | M | 74 |
| E9 | 79 | 14 | 7 | 0.70 | 0.70 | 2.00 | 0.70 | V0 | 37.0 | V0 | 32.6 | M | 88 |
| E10 | 79 | 14 | 7 | 1.50 | 1.50 | 2.00 | 0.70 | V0 | 38.4 | V0 | 30.8 | M | 80 |
| CE11 | 79 | 14 | 7 | 0.05 | 0.05 | 2.00 | 0.70 | V0 | 37.4 | V0 | 21.0 | M | 56 |
| CE12 | 79 | 14 | 7 | 2.00 | 2.00 | 2.00 | 0.70 | V2 | 32.4 | V2 | 28.2 | B | 87 |
| CE13 | 79 | 14 | 7 | 0.00 | 0.70 | 2.00 | 0.70 | V0 | 35.4 | V0 | 17.3 | M | 49 |
| CE14 | 79 | 14 | 7 | 0.00 | 1.50 | 2.00 | 0.70 | V0 | 33.5 | V0 | 18.0 | M | 54 |
| CE15 | 79 | 14 | 7 | 0.70 | 0.00 | 2.00 | 0.70 | V0 | 36.2 | V0 | 20.3 | M | 56 |
| CE16 | 79 | 14 | 7 | 1.50 | 0.00 | 2.00 | 0.70 | V0 | 35.7 | V0 | 22.3 | M | 62 |
| E11 | 81 | 13 | 6.5 | 0.30 | 0.30 | 2.00 | 0.70 | V0 | 38.9 | V0 | 31.2 | M | 80 |
| E12 | 76 | 16 | 8 | 0.30 | 0.30 | 2.00 | 0.70 | V0 | 32.5 | V0 | 22.6 | M | 70 |
| CE17 | 73 | 18 | 9 | 0.30 | 0.30 | 2.00 | 0.70 | V0 | 31.4 | V2 | 15.9 | B | 51 |
| CE18 | 89 | 7 | 4 | 0.30 | 0.30 | 2.00 | 0.70 | V2 | 42.3 | V2 | 37.5 | B | 89 |

| | Composition Component (100 g) | | | | | | | 168 hours(7 days) after hydrothermal dipping | | | | |
|---|---|---|---|---|---|---|---|---|---|---|---|---|
| | | | | | | | | Flame retardancy (1/32") | Tensile impact strength | Mainten-ance of FR | Mainten-ance of TIS (%) | Final Grade |
| | A | B | C | D | E | F | G | | | | | |
| E7 | 79 | 14 | 7 | 0.30 | 0.30 | 2.00 | 0.15 | V0 | 35.2 | M | 100 | F1 |
| E8 | 79 | 14 | 7 | 0.30 | 0.30 | 2.00 | 3.00 | V0 | 38.6 | M | 118 | F1 |
| CE8 | 79 | 14 | 7 | 0.30 | 0.30 | 2.00 | 5.00 | V2 | 33.6 | D | 98 | NG |
| CE9 | 79 | 14 | 7 | 0.30 | 0.30 | 2.00 | 0.00 | V2 | 38.4 | D | 96 | NG |
| CE10 | 79 | 14 | 7 | 0.30 | 0.30 | 2.00 | 0.05 | V2 | 35.6 | D | 96 | NG |
| E9 | 79 | 14 | 7 | 0.70 | 0.70 | 2.00 | 0.70 | V0 | 36.3 | M | 98 | F1 |
| E10 | 79 | 14 | 7 | 1.50 | 1.50 | 2.00 | 0.70 | V0 | 41.4 | M | 108 | F1 |
| CE11 | 79 | 14 | 7 | 0.05 | 0.05 | 2.00 | 0.70 | V0 | 38.3 | M | 102 | F2 |
| CE12 | 79 | 14 | 7 | 2.00 | 2.00 | 2.00 | 0.70 | V2 | 33.6 | B | 104 | F2 |
| CE13 | 79 | 14 | 7 | 0.00 | 0.70 | 2.00 | 0.70 | V0 | 37.9 | M | 107 | F2 |
| CE14 | 79 | 14 | 7 | 0.00 | 1.50 | 2.00 | 0.70 | V0 | 35.9 | M | 107 | F2 |
| CE15 | 79 | 14 | 7 | 0.70 | 0.00 | 2.00 | 0.70 | V0 | 37.2 | M | 103 | F2 |
| CE16 | 79 | 14 | 7 | 1.50 | 0.00 | 2.00 | 0.70 | V0 | 33.6 | M | 94 | F2 |
| E11 | 81 | 13 | 6.5 | 0.30 | 0.30 | 2.00 | 0.70 | V0 | 39.6 | M | 102 | F1 |
| E12 | 76 | 16 | 8 | 0.30 | 0.30 | 2.00 | 0.70 | V0 | 33.1 | M | 102 | F1 |

TABLE 2-continued

| CE17 | 73 | 18 | 9 | 0.30 | 0.30 | 2.00 | 0.70 | V0 | 33.0 | M | 105 | F2 |
| CE18 | 89 | 7 | 4 | 0.30 | 0.30 | 2.00 | 0.70 | V2 | 39.3 | B | 93 | NG |

*Unit of Composition Component: 100 g,
A: Homopolymer of polypropylene with MFR of 8 g/10 min,
A1: Homopolymer of polypropylene with MFR of 4 g/10 min,
A2: Homopolymer of polypropylene with MFR of 18 g/10 min,
A3: Homopolymer of polypropylene with MFR of 2 g/10 min,
A4: Homopolymer of polypropylene with MFR of 20 g/10 min,
B: Flame retardant agent,
C: antimony trioxide,
D: UV absorbent,
E: HALS ultraviolet stabilizer,
F: Titanium Dioxide,
G: silane coupling agent In Tables 1 and 2, an "F1" in the column titled "Final Grade" indicates that a V-0 grade of flame retardancy and more than 70% of the initial tensile impact strength are maintained after UV exposure testing and hydrothermal dipping testing. An "F2" indicates that a V-0 grade of flame retardancy and more than 70% of the initial tensile impact strength are maintained after UV exposure testing or hydrothermal dipping testing. A "NG" (No Grade) indicates that the grade is neither F1 nor F2. An "M" (Maintained) in the column titled "Maintenance of FR" indicates that flame retardancy is maintained after treatment, a "B" (Below) indicates a V-2 grade of flame retardancy both before and after treatment, and a "D" (Deteriorated) indicates that an initial V-0 grade of flame retardancy is reduced to V-2.

As shown in Tables 1 and 2, the polypropylene resin composition of the present invention, which includes about 40–90% by weight polypropylene resin with a melt flow rate of about 4–18 g/10 minutes, about 9–16% by weight halogen-containing flame retardant additive with a low melt point, about 4–15% by weight antimony oxide in the form of white granules, about 0.2–3.0% by weight ultraviolet stabilizer, about 0.1–5% by weight silane coupling agent, and about 0.2–5% by weight titanium dioxide, exhibits excellent weathering characteristics and maintains excellent physical/mechanical properties as well as a flame retardancy grade of V-0 grade after hydrothermal dipping testing.

As described above, the polypropylene resin composition, according to the present invention, exhibits an excellent initial flame retardancy and maintains a high flame retardancy as well as excellent physical/mechanical properties after long-term outdoor exposure and long hydrothermal treatments at a film thickness of 1/32 inch providing a grade of F1 in the UL 746C environmental resistance test. The resin of the present invention can be used in products such as light bulb sockets for Christmas tree lights that may experience long-term outdoor exposure.

What is claimed is:

1. A flame retardant polypropylene resin composition comprising:

40–86% by weight of polypropylene resin with a melt flow rate of 4–18 g/10 minutes;

9–16% by weight of a halogen-containing flame retardant additive having a melting point of 95° C. to 120° C.;

4–15% by weight of an antimony oxide in the form of white granules;

0.2–3.0% by weight of an ultraviolet stabilizer, wherein the ultraviolet stabilizer comprises a mixture of a HALS ultraviolet stabilizer with a molecular weight of more than 2,000 and a UV absorber, wherein the ratio of HALS ultraviolet stabilizer to the UV absorber, ranges from 1:15 to 15:1;

0.1–5% by weight of a silane coupling agent; and 0.2–5% by weight titanium dioxide.

2. The flame-retardant polypropylene resin composition according to claim 1 wherein the polypropylene resin is a polypropylene homopolymer or a crystalline polypropylene copolymer.

3. The flame retardant polypropylene resin composition according to claim 1 wherein the halogen-containing flame retardant additive is tetrabromobisphenol A bis-(dibromopropylether), tetrabromodimethylsulfone dipropylether, or a mixture thereof.

4. The flame-retardant polypropylene resin composition according to claim 1 wherein the antimony oxide is antimony trioxide, antimony pentaoxide, or a mixture thereof.

5. The flame-retardant polypropylene resin composition according to claim 1 wherein the silane coupling agent is vinyl trimethoxy silane, vinyl triethoxy silane, 3-aminopropyl triethoxy silane, N-(2-aminoethyl)-3-aminopropyltrimethoxy silane, 3-glycydoxypropyl trimethoxy silane, 3-chloropropyl trimethoxy silane, 3-methacryloxypropyl trimethoxy silane, or 3-mercaptopropyltrimethoxy silane.

* * * * *